Figure 1:
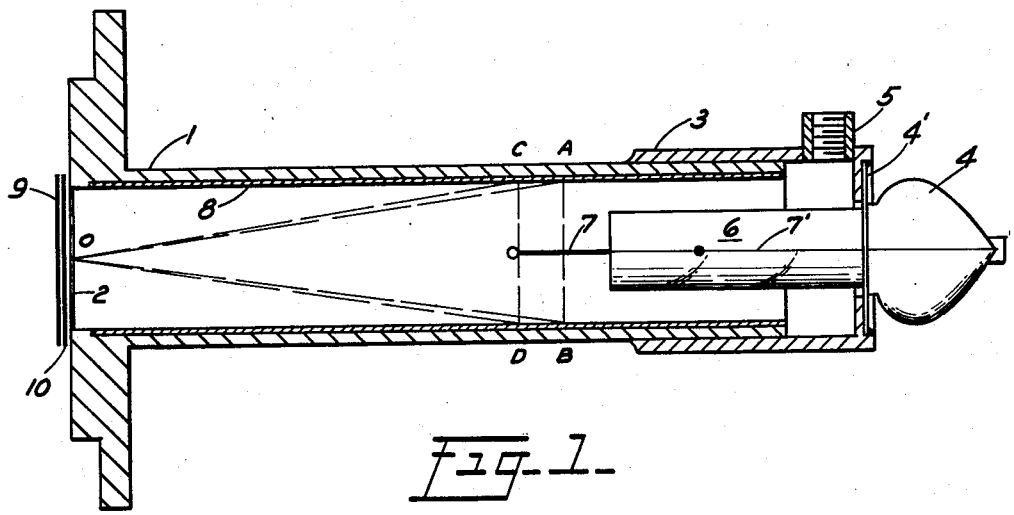

July 6, 1954   B. R. GOSSICK   2,683,221
PARTICLE AND GAMMA-RAY ENERGY SPECTROMETER
Filed June 12, 1951

INVENTOR.
Ben R. Gossick
BY
ATTORNEY

Patented July 6, 1954

2,683,221

UNITED STATES PATENT OFFICE 2,683,221

PARTICLE AND GAMMA-RAY ENERGY SPECTROMETER

Ben R. Gossick, Lafayette, Ind., assignor to the United States of America as represented by the United States Atomic Energy Commission Application June 12, 1951, Serial No. 231,188

6 Claims. (Cl. 250—83.6)

The present invention relates to spectrometers, and more especially to a novel method of and apparatus for investigating the energy spectrum of a beam of neutrons, or other radioactive radiations.

In methods of the prior art, fast neutrons have been directed against an hydrogenous radiator, causing protrons to recoil through ionization chambers or proportional counters. The total ionization caused by any proton will be a measure of energy of the neutron which struck it, so in a proportional counter, the pulse height spectrum will be indicative of the neutron energy spectrum. For a monochromatic neutron beam, the integral bias curve will exhibit a break at the Gaussian peak. Therefore the first derivative of the pulse height distribution should give a peak at the neutron energy. However wall effects, positive ion effects, straggling, and other factors distort the ideal distribution. Also it is generally necessary to count the pulses accepted at each of several successive levels by successively changing the acceptance level of a pulse height selector, and to plot a curve of counting rate versus the pulse height setting. It is further necessary to take the derivative of that curve, which results in a curve of the number of pulses falling within a very narrow increment of pulse height versus that selected pulse height, in order to obtain the desired energy distribution.

However, I have discovered that by employing a proportional counter of a novel design, a solid hydrogenous radiator, and a linear pulse amplifier biased to count only very large pulses, I can provide a fast neutron spectrometer with which the energy distribution can be obtained without taking derivatives of the counting rate. According to the principles of my invention, only those proton recoils are counted which traverse a given thickness of an absorber material, pass through a collimator, and then end their paths near a short stub anode. A linear pulse amplifier is biased to accept only pulses near the peak energy; a. g., those at the maximum of the Bragg specific ionization curve. Thus the range is associated directly with the number of counts, for only those protons traveling the predetermined distance from radiator to stub anode, and stopping near the anode, will produce sufficient ionization to be counted.

Accordingly, it is a primary object of my invention to provide a spectrometer with which the energy distribution of a beam of alpha particles, protons, or neutrons can be obtained without any differentiation of the counting rate.

Another object of my invention is to provide means for investigating the neutron energy spectrum electronically, utilizing a source of neutrons, a proton radiator, an absorber, an especial counter tube, and counting means.

Yet another object of my invention is to provide a proportional counter tube of novel design, and including a differential anode.

Figure 2:
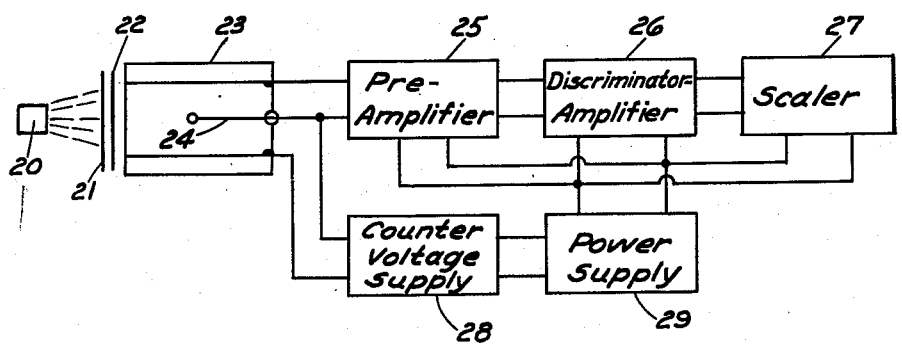

Other objects and advantages of my invention will be apparent from the following description, when read in connection with the appended drawing, in which:

Figure 1 illustrates schematically a preferred embodiment of the counter tube employed in my invention, together with the protron radiator and absorber discs employed therewith in my spectrometer, and Figure 2 illustrates schematically a complete spectrometer system utilizing the proportional counter tube of Figure 1.

Referring now to Figure 1, cylindrical shell 1 is closed at its flanged end by a thin window 2. Cap 3, bearing Kovar seal 4 forms a substantially gas tight closure of the opposite end of the counter shell. A nipple 5 for a filling tube is also carried by cap 3 and communicates with the interior of the counter. The filling tube, not shown, may be crimped or sealed in any convenient manner after the counter is properly filled. The Kovar seal 4 may be of the conventional type including Kovar flange 4', which may be soldered to cap 3, and glass sleeve 6, through which extends the electrical lead 7', spot welded to stub anode 7. This anode may preferably be of very small tungsten wire, very short in length, and may carry a conventional glass bead on its extremity. The inner surface of tube 1 may preferably be covered with a thin platinum liner 8 to reduce background count. Shown in place also are proton radiator 9, which may preferably be a thin polystyrene disc, and absorber 10, which may preferably be 2-S aluminum. The thickness of the radiator and the absorber, their separation, and the distance between the absorber and the counter window may be adjusted as desired to get maximum counting rate with the particular energy of the neutron beam investigated. The counter shell 1 may preferably be brass, as is the cap 3. Thin window 2 may be formed from mica, of the order of 1.5 milligrams per square centimeter in weight, and may be cemented to the counter flange with a suitable cement. In one satisfactory counter, the tube 1 is 1.5 centimeters in diameter, the center of anode 7 is 4.85 centimeters displaced from mica window 2, and the anode is .75 cm. in length and 4 mils in diameter. The counter is filled with 9 cm. Hg of argon and 1 cm. Hg of carbon dioxide, and is energized to operate at a gas amplification of substantially 20.

Figure 2 shows schematically a complete spectrometer system. A collimated source of neutrons 20 emits particles toward proton radiator 21. Recoil protons from the radiator pass through absorber 22 and enter counter tube 23. Those protons which end their travel very close to stub anode 24 will produce an extremely large pulse at the input terminals of preamplifier 25. Linear amplifier 26 includes a discriminator, or pulse height selector, which may be so biased that only the largest pulses from the counter 23 will be accepted and passed through to scaler 27. Counter voltage supply 28, energized from the common power supply 29, provides the high voltage necessary to operate counter 23 in the proportional region. The electronic circuits shown schematically may be of the conventional types. For example, the discriminator-amplifier 26 and preamplifier 25 may be the Model A-1, described in "Review of Scientific Instruments" 18, 703 (1947), while scaler 27 may be a conventional Higginbotham scale of 64, such as that described in "Review of Scientific Instruments" 18, 706 (1947).

In operation, the proton radiator, absorber, and counter tube are carefully aligned with the collimated source of neutrons. Bias of the discriminator section of the amplifier is carefully set, and the count is taken over a predetermined time interval. Then an absorber and/or a radiator of a different thickness is substituted for the previous one, and another count is taken. The energy of the incident neutrons which would end their range in the close vicinity of the short anode may be readily calculated, knowing the composition and thickness of the radiator and the absorber, the thickness of the mica window, the distances between source, radiator, absorber, window, and the center of the stub anode, and the composition of the counter filling gas. This energy, plotted against counting rate, gives the desired energy distribution curve.

It is apparent that the recoil protons must be collimated; that is, those scattered at an angle to the beam must be discarded, since they only mask pulses due to forward recoil from lower energy neutrons. In my spectrometer, the counter tube itself functions as the collimator. By experimental calibration of my counter tube, I have determined that the major portion of the area under the distribution curve obtained represents pulses produced by protons falling within the cone OAB of Figure 1, while only a small portion of the area under that curve represents pulses from protons falling between cones OAB and OCD.

While the above description has dealt with neutron spectrometers only, it will be apparent to those skilled in the art that alpha rays and protons could also be analyzed, simply by omitting the proton radiator and altering slightly the dimensions of the chamber. An aluminum radiator, to give Compton recoil electrons, may be utilized for gamma radiations. Therefore it will be appreciated that the embodiments herein described are to be construed as illustrative only and not in a limiting sense.

Having described my invention, I claim:

1. A spectrometer for analyzing a beam of incident radiations comprising a counter tube including a radiation window and a stub anode disposed in spaced relation thereto, a voltage supply connected to energize said tube, a plurality of absorber foils selectively disposable before said window, in alignment with said beam of radiations, and means for counting only those pulses produced by ionizing radiations ending their path closely adjacent thereto.

2. A neutron energy spectrometer comprising means for producing a collimated beam of neutrons, a proton radiator disposed in the path of said beam, means for absorbing a portion of the energy of said protons, a counter tube disposed in spaced relation with said radiator and said absorber and including a short stub anode disposed at a predetermined distance from the end of said counter nearest said source, means for energizing said counter tube, means for selecting only pulses greater than a predetermined magnitude from said counter, and means for counting those selected pulses.

3. In a neutron energy spectrometer for use with a collimated source of neutrons, the combination comprising a proton radiator, means for absorbing a portion of the proton energies, and a counter tube disposed in spaced relation to and in alignment with said source, said counter tube including a radiation-transparent window at one extremity and a stub ion-collecting electrode disposed axially thereof and in spaced relation with said window, amplifying means connected to said counter, means for selecting those pulses from said amplifying means greater than a predetermined magnitude, and means for counting those selected pulses, the number of said pulses being an indication of the relative abundance of neutrons of a selected energy.

4. A neutron energy spectrometer for obtaining data for the energy distribution curve of a collimated beam of neutrons comprising, in combination, proton radiator means disposed to intercept said beam, whereby protons are struck by said neutrons and knocked out of said radiator; a counter tube disposed in spaced relation with said radiator means and in axial alignment with said beam; means for interposing successively between said radiator and said tube a series of absorber plates to reduce the energy of said protons by successively differing amounts; means for energizing said counter tube; means for amplifying the pulses produced by proton-induced ionization within said tube; and means for selecting and counting only those pulses greater than a predetermined magnitude; said counter tube including a radiation entrance window at the extremity nearest said radiator and a centrally located stub electrode disposed near the opposite extremity thereof, said predetermined pulse magnitude being that obtained by pulses from protons ending their travel in that length of said counter between opposite ends of said stub electrode.

5. A detecting device comprising a tubular conductive envelope open at one end, a thin window sealing said open end, a counter-filling gas therein, and a stub electrode mounted coaxially therein at a greater distance than one-half the length of said envelope from said window.

6. A gamma-spectrometer for use with a collimated source of gamma rays comprising a thin metal radiator disposed in the path of said rays to produce recoil electrons from interaction with said rays, means for absorbing a predetermined portion of the energy of said electrons selectively disposable in spaced, aligned relation with said radiator, a counter tube having a window disposed in spaced aligned relation with said absorbing means, said counter being provided with a short stub anode mounted in spaced relation from said window, means for energizing said tube, means for selecting only pulses greater than a predetermined magnitude from said counter, and means for counting those selected pulses.

References Cited in the file of this patent

UNITED STATES PATENTS

| Number | Name | Date |
|---|---|---|
| 2,094,318 | Failla | Sept. 28, 1937 |
| 2,442,314 | Reid | May 25, 1948 |
| 2,452,524 | Metten | Oct. 26, 1948 |
| 2,490,298 | Ghiorso et al. | Dec. 6, 1949 |
| 2,556,768 | McKibben | June 12, 1951 |